United States Patent [19]

Cooke et al.

[11] 4,017,823
[45] Apr. 12, 1977

[54] POSITION CONTROL SYSTEM FOR A SUBSEA VEHICLE

[75] Inventors: David A. Cooke, Saratoga, Calif.; David M. Edison, Murrysville, Pa.

[73] Assignee: Subsea Equipment Associates Limited, Hamilton, Bermuda

[22] Filed: July 21, 1975

[21] Appl. No.: 597,577

[52] U.S. Cl. .............................................. 340/3 D
[51] Int. Cl.² ........................................ G01S 9/66
[58] Field of Search ....................... 340/3 D; 343/9

[56] References Cited

UNITED STATES PATENTS

| 3,594,716 | 7/1971 | Waterman | 340/3 D |
|---|---|---|---|
| 3,707,717 | 12/1972 | Frielinghaus | 343/9 X |

*Primary Examiner*—Richard A. Farley
*Attorney, Agent, or Firm*—Ernest F. Marmorek

[57] ABSTRACT

A position control system, for use in positioning relative to a subsea well a subsea vehicle or a re-entry tool having thrusters, including a Doppler sonar system connected to the vehicle and operable for generating a Doppler pulse train signal having a pulse rate substantially proportional to the Doppler frequency produced by a change in the spatial position of the vehicle along a predetermined linear coordinate, whereby the occurrence of each pulse signal in the Doppler pulse train signal corresponds substantially to a predetermined linear distance, velocity measurement means coupled to the Doppler pulse train signal and operable for converting it into an equivalent velocity amplitude, a pulse generator operable for producing a predetermined number of pulse signals equivalent to a certain linear distance along the coordinate, up/down counter means operable for counting up from one signal and down from another signal, connection means operable for connecting the up/down counter means to the Doppler pulse train signal and the pulse generator for opposite counting therein, and drive means connected to the up/down counter means and operable for supplying the count therein as an error signal for controlling one of the thrusters.

5 Claims, 29 Drawing Figures

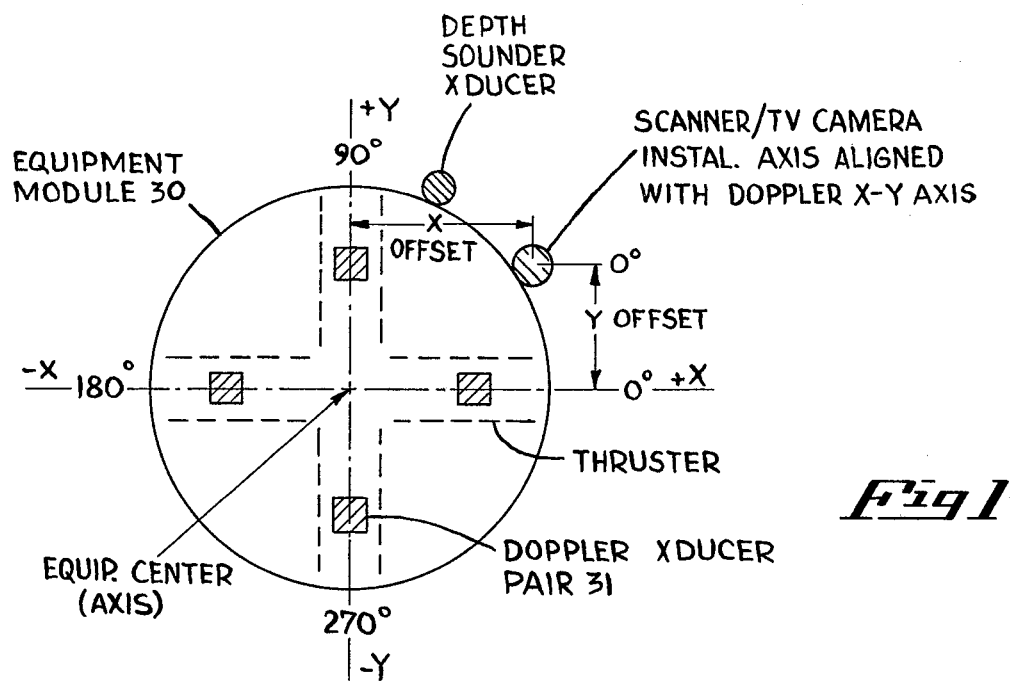
*Fig 1*
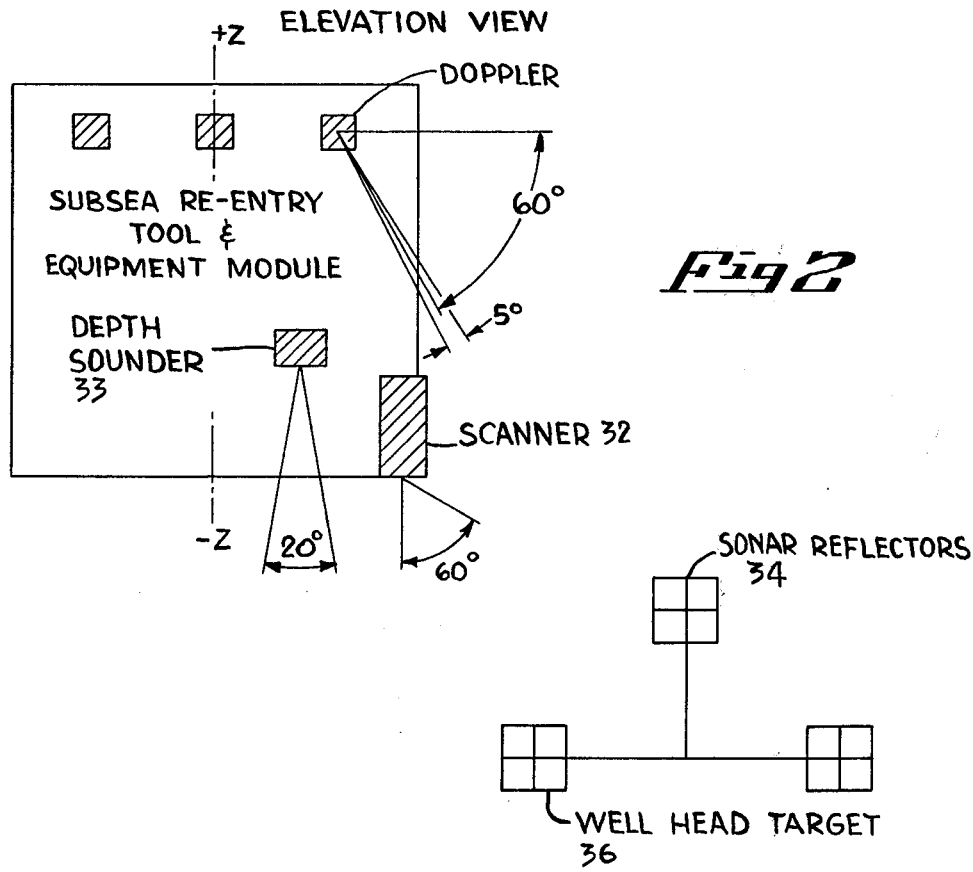
*Fig 2*
*Fig 3*

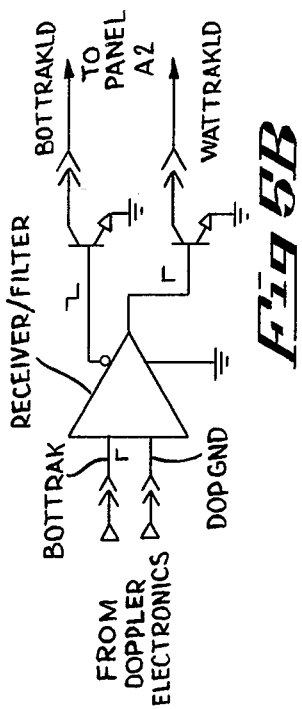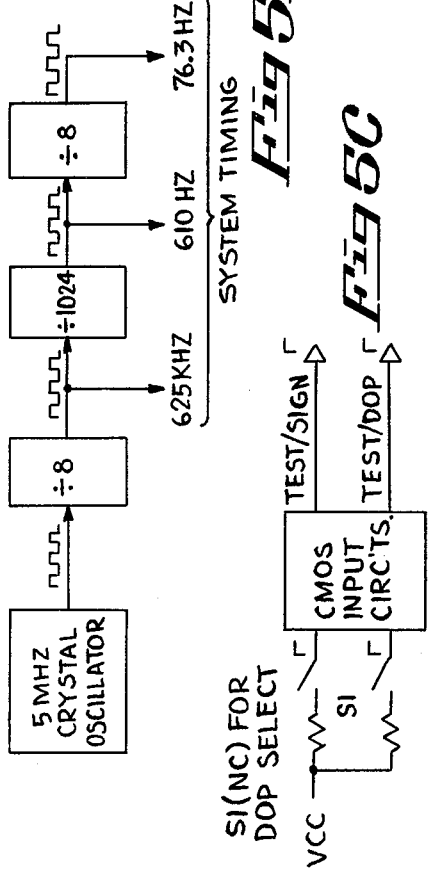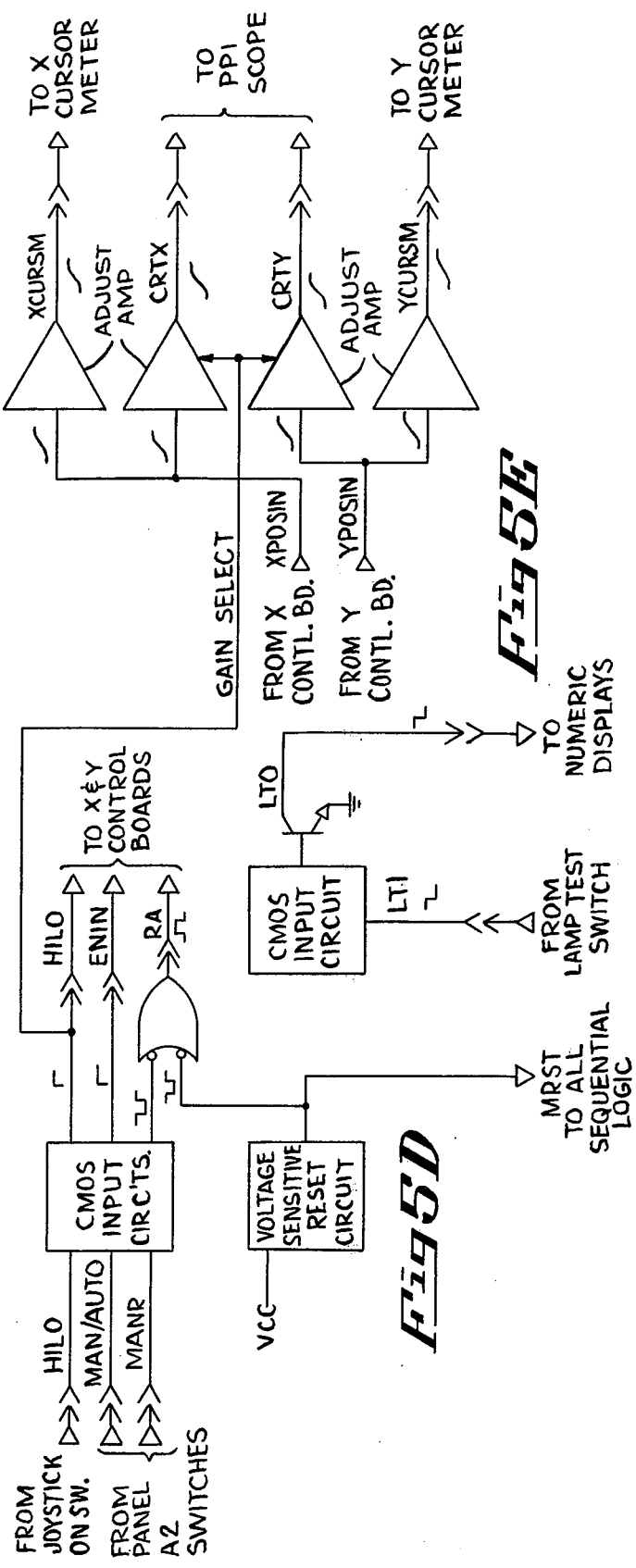

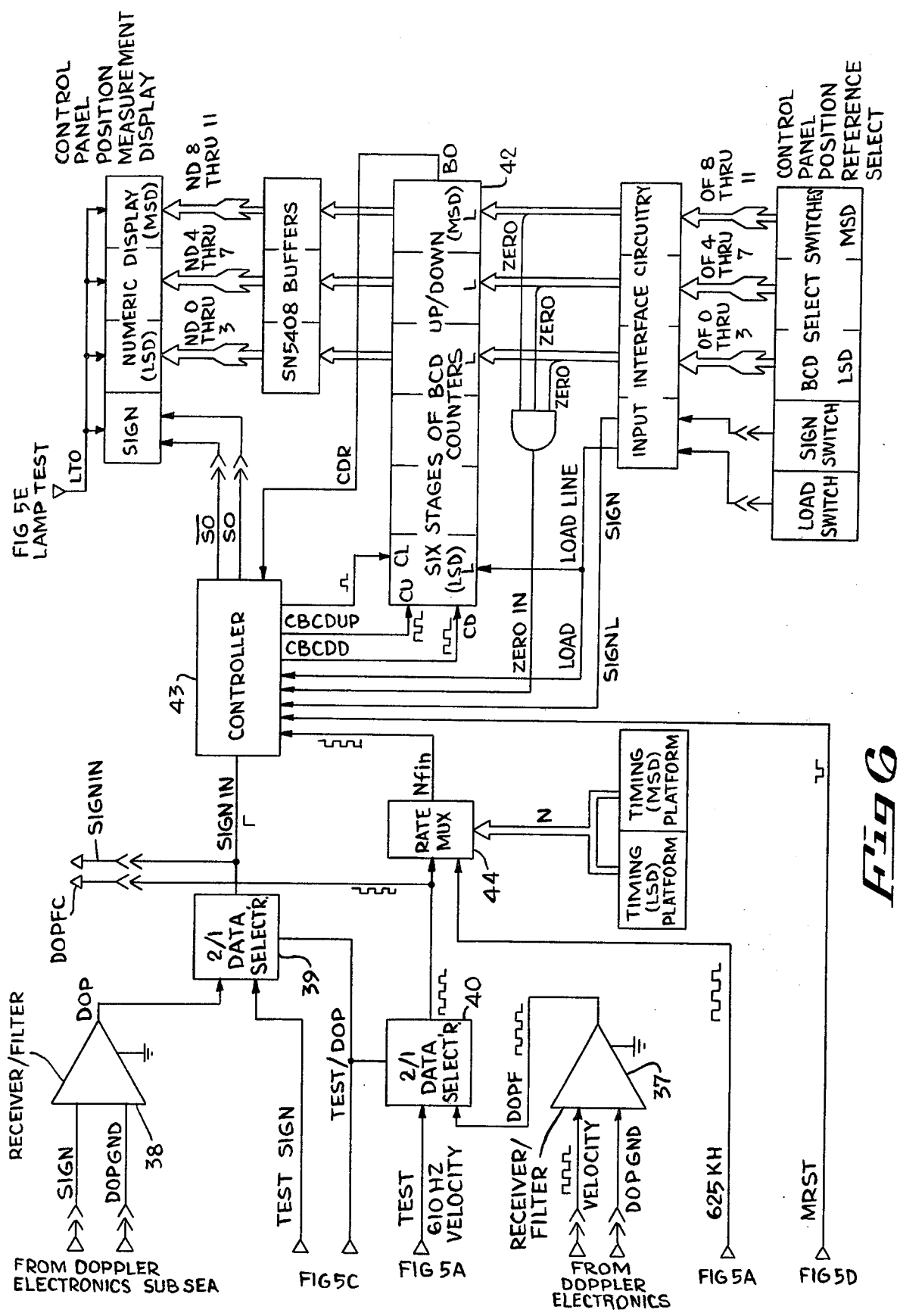

|  | DOPPLER SIGN = − | DOPPLER SIGN = + |
|---|---|---|
| COUNT = 0 | COUNT UP | COUNT UP |
| COUNT = POSITIVE NO. | COUNT DOWN | COUNT UP |
| COUNT = NEGATIVE NO. | COUNT UP | COUNT DOWN |
THE COUNT UP COMMAND IS PERFORMED BY GATING BCDCP ONTO CBCDUP
THE COUNT DOWN COMMAND IS PERFORMED BY GATING BCDCP ONTO CBCDD
*Fig 7*
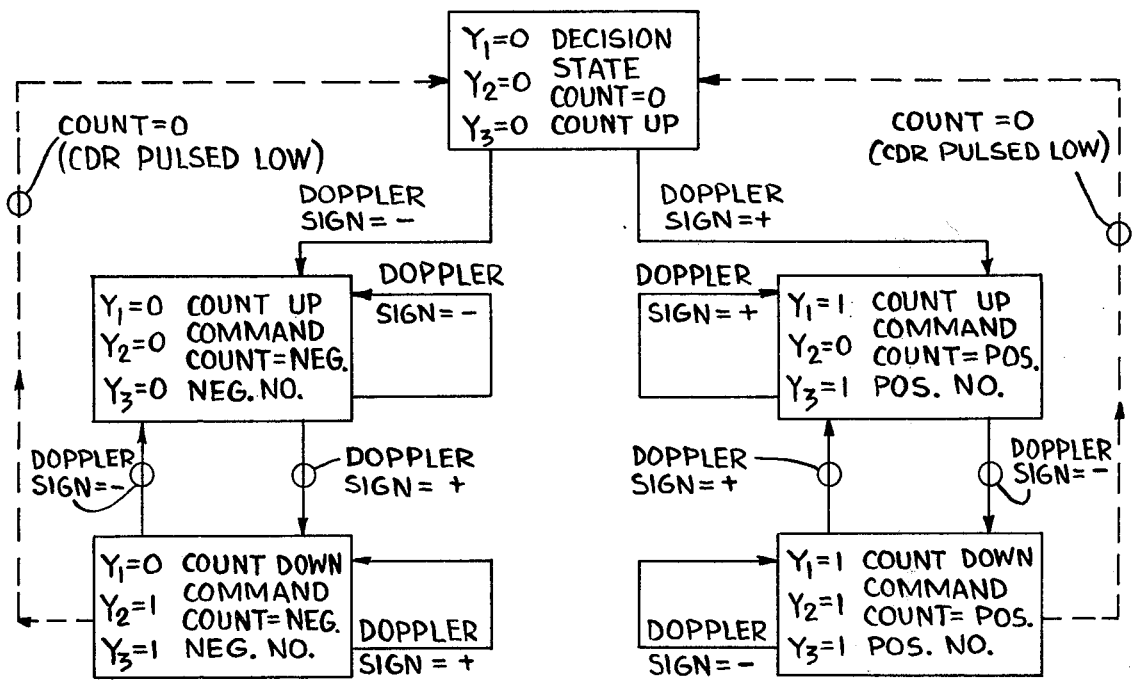
*Fig 8*
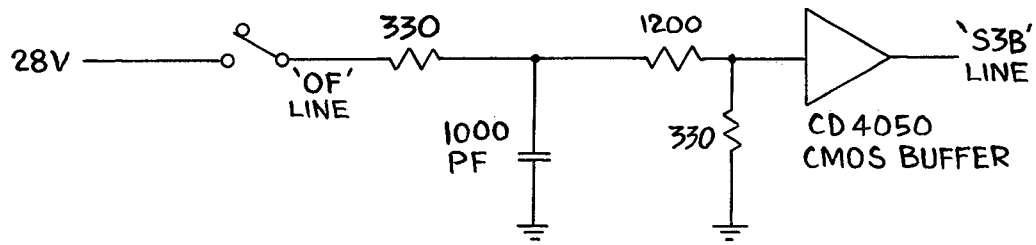
*Fig 9*

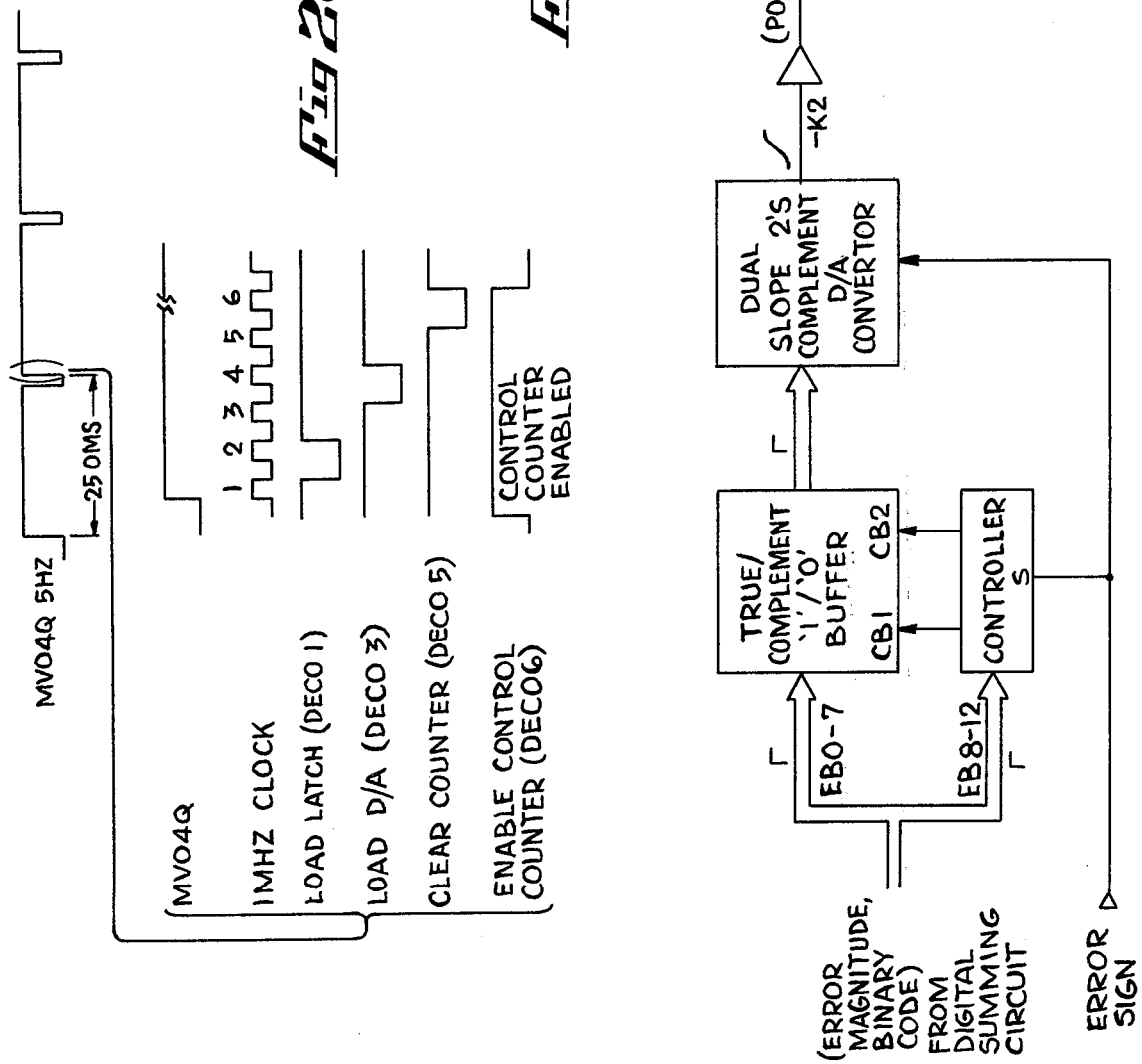

POSITION CONTROL SYSTEM FOR A SUBSEA VEHICLE

BACKGROUND OF THE INVENTION

The invention relates to a position control system for use in positioning relative to a subsea well a subsea vehicle or re-entry tool having thrusters.

During the drilling and after the completion of a subsea well or the like, heavy pieces of equipment must be lowered to the sea floor and accurately positioned over the well. Generally, prior art systems for positioning such equipment has included the use of guidelines, wire cables under tension. Such systems are complex and difficult to install. Furthermore, the guidelines are easily broken and are difficult to keep from becoming tangled. Some prior art systems have relied on the movement of the surface ship from which the equipment is suspended in order to maneuver re-entry equipment without the use of guidelines. This approach is time consuming and requires a large reentry cone at the wellhead and is not at all suitable in rough weather.

SUMMARY OF THE INVENTION

One of the principle objects of the inventions is a position control system, for use in positioning relative to a subsea well a subsea vehicle or re-entry tool having thrusters.

Another object of the invention is a position control system including a Doppler sonar system connected to the vehicle and operable for generating a Doppler pulse train signal having a pulse rate substantially proportional to the Doppler frequency produced by a change in the spatial position of the tool along a predetermined linear coordinate, whereby the occurrence of each pulse signal corresponds substantially to a predetermined linear distance velocity measurement means coupled to the Doppler pulse train signal and operable for converting it into an equivalent velocity amplitude, a pulse generator operable for producing a predetermined number of pulse signals equivalent to a certain linear distance along the coordinate, up/down counter means operable for counting up from one signal and down from another signal, connecting means operable for connecting the up/down counter means to the Doppler pulse train signal and the pulse generator for opposite counting therein, and drive means connected the up/down counter means and operable for supplying the count therein as an error signal for controlling one of the thrusters.

Further objects and advantages of the invention will be set forth in the following specification and, in part, will be obvious therefrom without being specifically referred to, the same being realized and attained as pointed out in the claims hereof.

The invention accordingly comprises the features of construction, combination of elements and arrangement of parts which will be exemplified in a construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings, in which:

FIG. 1 is a diagramatical end view of an equipment module illustrating the typical positions of elements according to the invention;

FIG. 2 is a diagramatical end view of the module of FIG. 1;

FIG. 3 is a diagramatical plan view of a well head showing the typical relative positions of sonar reflectors according to the invention;

FIGS. 5A, 5B, 5C, 5D and 5E are block diagrams of the auxiliary timing control system according to the invention;

FIG. 6 is a block diagram for the position measurement system for the respective linear coordinates according to the invention;

FIG. 7 shows the decision logic for the counter controller in FIG. 6;

FIG. 8 is a flow diagram of the operation of the counter controller in FIG. 6;

FIG. 9 shows a typical input circuit for the counter controller in FIG. 6;

FIG. 20 shows the control relationship for the counter in FIG. 19; and

FIG. 21 is a block diagram of the position logic loop system according to the invention.

DESCRIPTION OF THE PREFERRED EMBODIMENT

Figure 4:
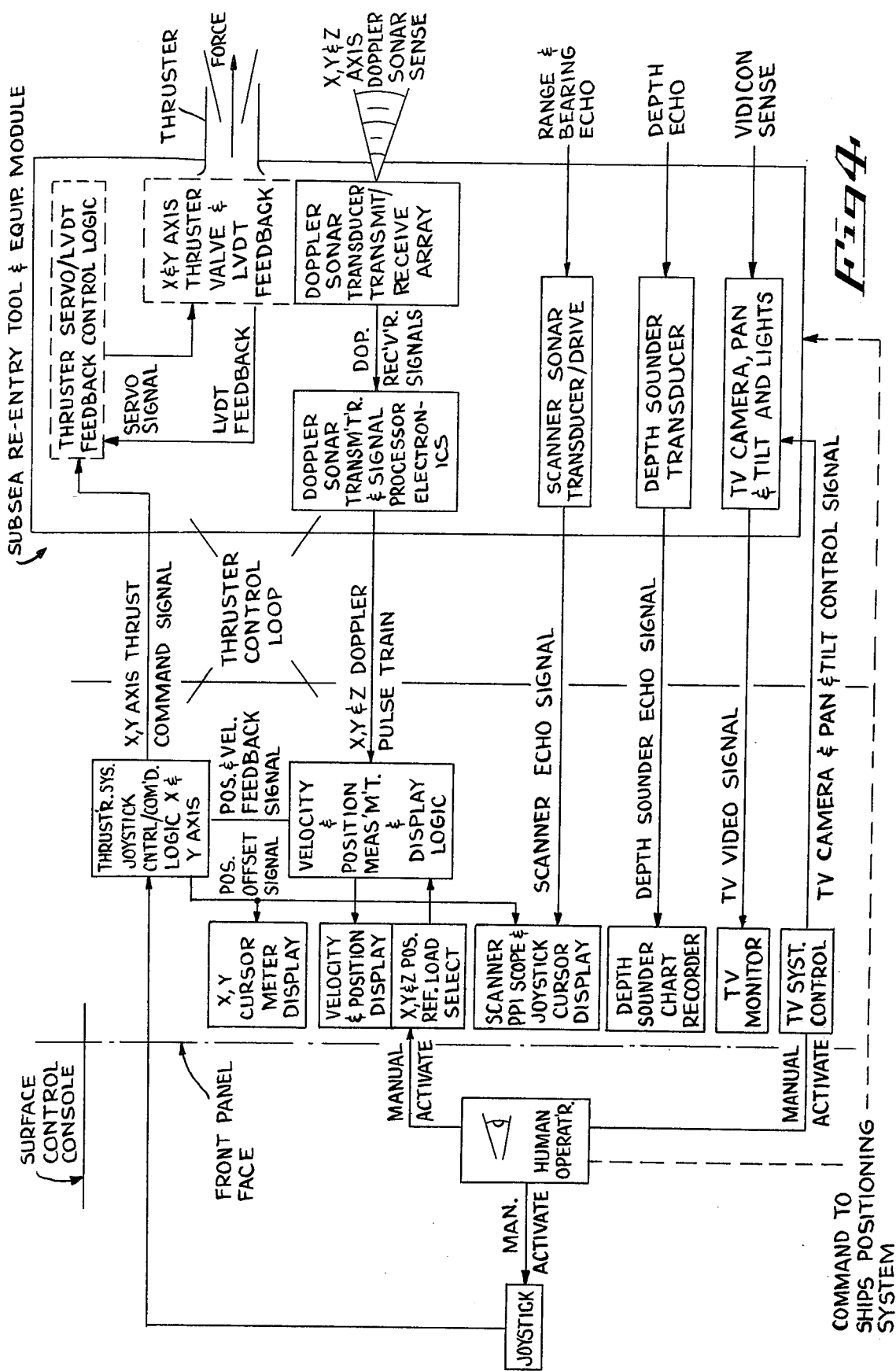
FIG. 4 is a functional system block diagram of the invention.

In carrying the invention into effect, one of the embodiments has been selected for illustration in the accompanying drawings and for description in this specification.

Generally, the re-entry equipment module 30 utilizes four sets of Doppler Sonar Transmitters/Receiver Transducer pair 31 positioned on an X and Y axis coordinates establish a reference center line such as shown in FIG. 1. The transducer pairs 31 determine the guidance reference axis and must be accurately installed to achieve alignment of the reference axis to the re-entry equipment module 30 axis. The array of transducer pairs 31 must be installed so that all of them lie in a common plane and are equidistant from the reference axis. The plane defined by the X and Y axes should be substantially perpendicular to the Z axis defined for the movement of the equipment module 30. The Doppler Sonar System provides signals to be used for determining position and velocity by transmitting and receiving sonar beams from the respective 0°, 90°, 180° and 270° azimuthal positions.

It is desirable to include on the equipment module 30 a scanner sonar system 32 parallel to the XY axis as shown in FIG. 2 to produce a display for a plan position indicator (PP1) monitoring the equipment module 30 with respect to the wellhead.

A television camera is preferably located near the scanner sonar system 32 to provide a corresponding viseral image. The television camera should be positioned in alignment with the reference axis in order to simplify operations.

In addition, a depth sounder transducer 33 attached to the equipment provides the measurements of depth to the sonar reflecting surfaces 34 shown in FIG. 3 from a reference position.

The wellhead target 36 is arranged to have three sets of sonar target reflectors 34 attached thereto to define the landing center as shown in FIG. 3.

Generally, the re-entry guidance operation has two basic phases, namely an initial long-range acquisition and a final landing guidance. The initial acquisition can be accomplished by using search, scanner mode sonar and the landing guidance can use a simple scanner mode sonar. A true XY reference position is obtained by positioning the equipment equal distant from the target reflectors 34. The X,Y distances measured from the sonar are slant ranges, not true coordinate distances.

FIG. 4 shows a functional block diagram of the instant invention. The operator visually interprets a guidance display and manually loads the X,Y and Z position reference values. The operator also adjusts the television camera orientation, lighting, and focus and commands on X and Y axes thrust control position. The operator will also control the television monitor and sonar systems through an enhanced guidance display.

A JOYSTICK command is a single lever control for setting the X and Y coordinate changes in order to move the re-entry equipment module 30 to the wellhead.

FIG. 5 shows a system block circuitry. A 5 MHZ square wave signal generated from a crystal oscillator is divided down by counters into three different frequencies and distributed in the system. A 625 KHZ clock signal is a fundamental control clock signal and is used by all sequential logic. The 610 KHZ clock signal is used as a reference clock for the check-out and calibration of the system and for the excitation of the JOYSTICK. The 76.3 HZ reference clock signal is used by the Z direction velocity measurement circuitry for timing purposes.

The block diagram shown in FIG. 6 is typical for the X,Y and Z axes. This circuitry performs the position measurement numeric display, and position reference load functions.

Generally, the Doppler System generates a square wave pulse train for the XYZ axes at a frequency fv equal to KV wherein K is a constant based on the Doppler parameters and V is the speed in the coordinate direction. The Doppler System also generates a sign signal in which a logical "1" corresponds to positive travel.

In operation, optical isolators enable information to be coupled into the control console electronics while maintaining electrical isolation between the equipment module 30 and the console electronic system.

The time constant of the Doppler velocity signal filter for the X and Y axis is 160 micro seconds, 1200 micro seconds for the sign filter. The pulse width of the Z axis Doppler velocity signal is shorter than a X and Y signals so the filter time constant for that axis is 40 microseconds. These time constants permit the passage of pulse trains of Doppler pulse signals and the rejection of shorter noise signal. The threshold voltage of the gate is reached approximately 0.23 seconds after the voltage appears at input to the filter dependent upon the magnitudes of the threshold voltage. The maximum accepted frequency (fm) of the Doppler square wave signal is about 2.18 divided by time constant of filter 37 for a threshold voltage of about 2.5 volts. The maximum frequency accepted at the X and Y velocity input terminals is about 13.6 KHZ which is well beyond the ten knot Doppler system limit. The instant system utilizes a digital filter which, in contrast to linear filters, either passes a square wave signal substantially without attenuation or rejects it substantially completely.

The 2/1 selectors 39 and 40 select the 610 clock signal as the input signal for the X,Y and Z velocity signals and the status of the test signal switch as the Doppler sum input signal. The output of the 2/1 velocity data selector 40 is called "DOPFC" and the output of sign data selector (sign mux) 39 is called "SIGN IN".

In theory, DOPFC equals KV wherein V is in feet per second. DOPFC is the input wave form frequency in Hertz and K is a constant with dimensions of cycles per feet. From $$S = \int_0^T V dT,$$

wherein S is in feet, $$S = \frac{1}{K} \int_0^T DOPFC.$$

If $N = 1/K$, the position measurement circuitry perform the above integration by first multiplying the frequency of the Doppler frequency signal by N and then intergrates by counting the resulting frequency on the BCD space Up/Down counter 42.

The timing constant N is programmable and is a two digit number which can be varied between 1 and 99. The objective of the program constant is to allow for system adjustment for the Doppler conversion constant K resulting from temperature affects on sonar velocity and the installation variations of the Doppler for transduces.

Each output (N FIN) pulse signal from the frequency multiply (weight mux) as the weight of $0.1 \times 10^3$ feet or 0.1 millifoot (mft). The constant N can vary the weight of each Doppler pulse from about 0.1 to 9.9 mft. The controller 43 gates the pulse train the N FIN line onto either CBCDD line or CBCDUP line depending upon the state of the SIGNIN line (direction of travel), and the sign of the number in a counter. The six digit BCD counter 42 counts up when the CBCDUP line is pulsed and counts down when the CBCDD line is strobed. As each pulse on the N FIN line has a weight of 0.1 mft., the least significant digit of the counter is in 0.1 mft., and as there are six stages, the most significant digit is in tens of feet. Only the three most signifigant digits are displayed on the control panel as indicated in FIG. 6. The operator can pre-set the three highest digits in the counter 42 to the number set in the three digits of the pushbutton select switches. The load switch also clears the three least signifigant stages and loads the sign (SIGNL line) into the controller 43.

The rate mux circuit 44 includes two up/down BCD counters that count down the 625 HZ reference clock signal whenever an enable flip-flop has been set. This flip-flop is set by the leading edge of the pulse signal received on the output terminals of the test flash Doppler 2/1 data selector 40. When the count is 0, a clear pulse is generated to reset the enabled flip-flop to 0 and load the 8 bit BCD number on the timing platform into the parallel input terminals of the counters. The circuit then remains idle until the line again goes off. While the enable flip-flop is high, the average 625 KHZ clock signal is gated onto the BCDCP line which is identical to the NFIN line. Thus, each lagging edge of the Doppler Pulse signal produces N pulses at 625 KHZ on the BCBCP line. An additional flip-flop using the 625 KHZ as a clock signal synchronizes the Doppler pulse train signal with the 625 KHZ clock signal to prevent noise spikes in the CBCDP line.

The timing platforms are programmed by connecting each of the four BCD lines to either ground or VR.

The counter controller 43 uses the information from the test/dop mux and the sign status of the counters to determine which of the two count lines, CBCDD (count/down), or CBCDUP (count/up) to gate the pulse train signal on the BCDCP line from the rate mux 44. It also stores the sign status of the counters and displays it on the console position displays. FIG. 7 shows the count decision logic that the controller 43 uses. There are six possible combinations of counter status and Doppler sign input information from the sign mux. The FIG. 7 shows the response of the controller 43 for each of the six possible combinations. The controller 43 commands count up action by setting S2C34 high and count down by setting S2C35 high.

The controller 43 is a 5-state device and therefore has three flip-flop memory elements designated as Y1, Y2 and Y3 respectively. Whenever Y1 is high, a positive number exists in the counter and when low, the counter contains a negative count. The Y1 is buffered and displayed at the control panel. The Y2 is high whenever the counters are to count down, and low whenever the counters count up. The Y3 is low when the count equals zero.

FIG. 8 shows a flow diagram of the control operation of the controller 43, between control states. The control can operate in both synchronous and asynchronous modes.

The clear lines of the memory elements are pulsed low (CDR = 0) whenever the borrow output terminal of the MSD counter goes low indicating that the counter is trying to count down from 000000 to 999999. This clears the controller 43 back to the 000 state which starts a count up operation. This is asynchronous as it is independent of the clock or the JK input to the flip-flops. The synchronous operation uses the pulse train on the BCDCP line as the clock with normal JK master slave flip-flop operation. The controller 43 is preset to one of the three count up states whenever the operator activates the load switch on the console. If the BCD number in the switches at the console is a 000, the controller 43 is asynchronously cleared to the 000 state during the load operation in respective of the status of the sign switch on the console. The LNZ line is low whenever all three BCD digits of the switch input are equal to 0. Whenever the sign switch is closed (the sign of the number to be loaded is positive with SIGNL =1) and the number is unequal to 0 LNZ = 1), the controller 43 is preset to the 101 state when the load switch is activated. Likewise, when the sign switch is open (SIGNL = 0) and LNZ = 1, the controller 43 moves to the 001 state during load. The decoder circuit decodes the LNZ and SIGNL lines whenever the load is high. The load is high whenever the load switch on the console is depressed. At power on, or during reset, the controller is cleared to the 000 state.

The BCD or binary coded decimal up/down counters include six stages and count up whenever the CBCDUP line goes high and down whenever the CBCDD line goes high. The CBCDUP and CBCDD lines are controlled by the controller.

The most significant digits of the counter can be preset with a three digit number from a position select switch on the control panel. The three digits are BCD coded into 12 control lines. Each line is a logical "1" when at plus 28 volts and at a logical "0" when at the ground.

The circuit as shown in FIG. 9 is used as an input circuit for converting 28 volt logic to a 5 volt TTL compatible level. The 1000 PF capictor suppresses cross talk between signal lines.

Figures 10, 10A:
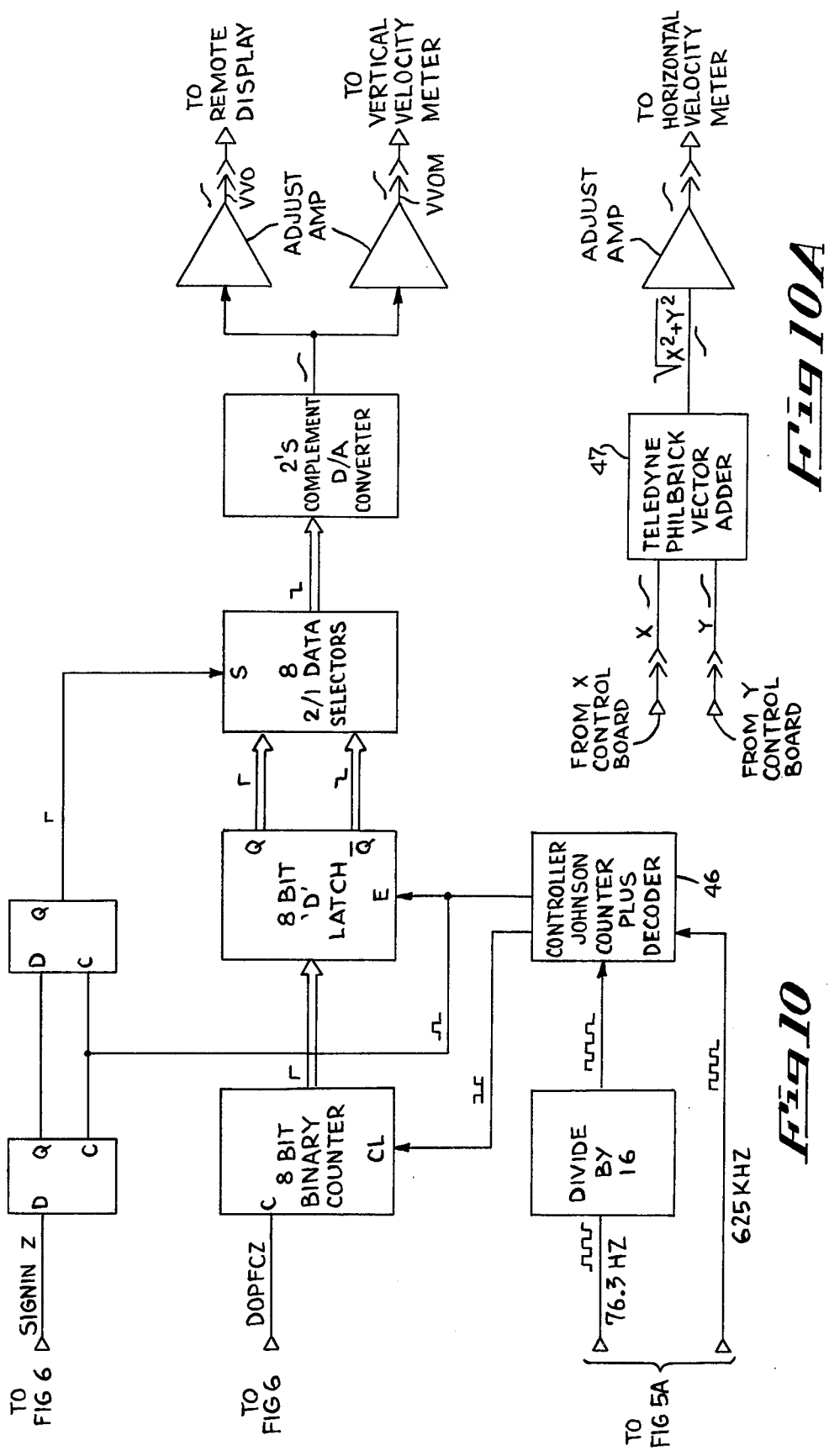
FIGS. 10 and 10A are block diagrams for the horizontal and vertical velocity system according to the invention.

The vertical velocity circuitry is shown in FIG. 10. The D/A converter provides a bipolar and lock signal that can carry between ± 10 volts. The digital input is in "2's" complement code. The velocity circuitry converts the absolute value of the velocity, VABS, (encoded in binary) whenever the sign is negative. The sign bit is the MSB of the 12-bit code. The 1-bit error is of no importance here. VABS is calculated by counting the number of pulse, $n$, that arrive on the DOPF line during a fixed period of time T.

The frequency $f$ equals $n/T$ and KB so that $B = f$ divided by K and Pf. The constant P is essentially the same as N and is obtained with the adjustable amplifier at the output terminals of the D/A converter. The counting time T is obtained with 16 counts and the 76.3 reference clock.

The input "AND" circuit prevents the counter from going back to 0 once it saturates all 1's. The counter is cleared once every 0.210 seconds after it has been loaded into the 8-bit D latch. The time T between counter clear signals is considered as the sampling and a maximum of 511 pulses can be counted during that time. Therefore, the circuit can record a maximum velocity frequency of 511/0.210 or 2437 HERTZ. This corresponds to all 1's at the output terminals of the counter. While the output terminals of the counter is being loaded into the latch, the DOPSCZ (sign) line is sampled and loaded into the first flip-flop to record the sign from the next time period. Meanwhile, the output terminals of the first flip-flop is loaded into the second become the MSB of the 12-bit code and to control the 2/1 data selectors which will select the count when the sign is positive (DOPSCZ = 1) and the count when the sign is negative. The output of the data selector is then converted to the bipolar ± 10 volt and a log signal by the D/A converter. The VVO signal is routed to a console output for essential remote use. The VVOM signal drives the vertical velocity meter on the console control panel.

Figure 11:
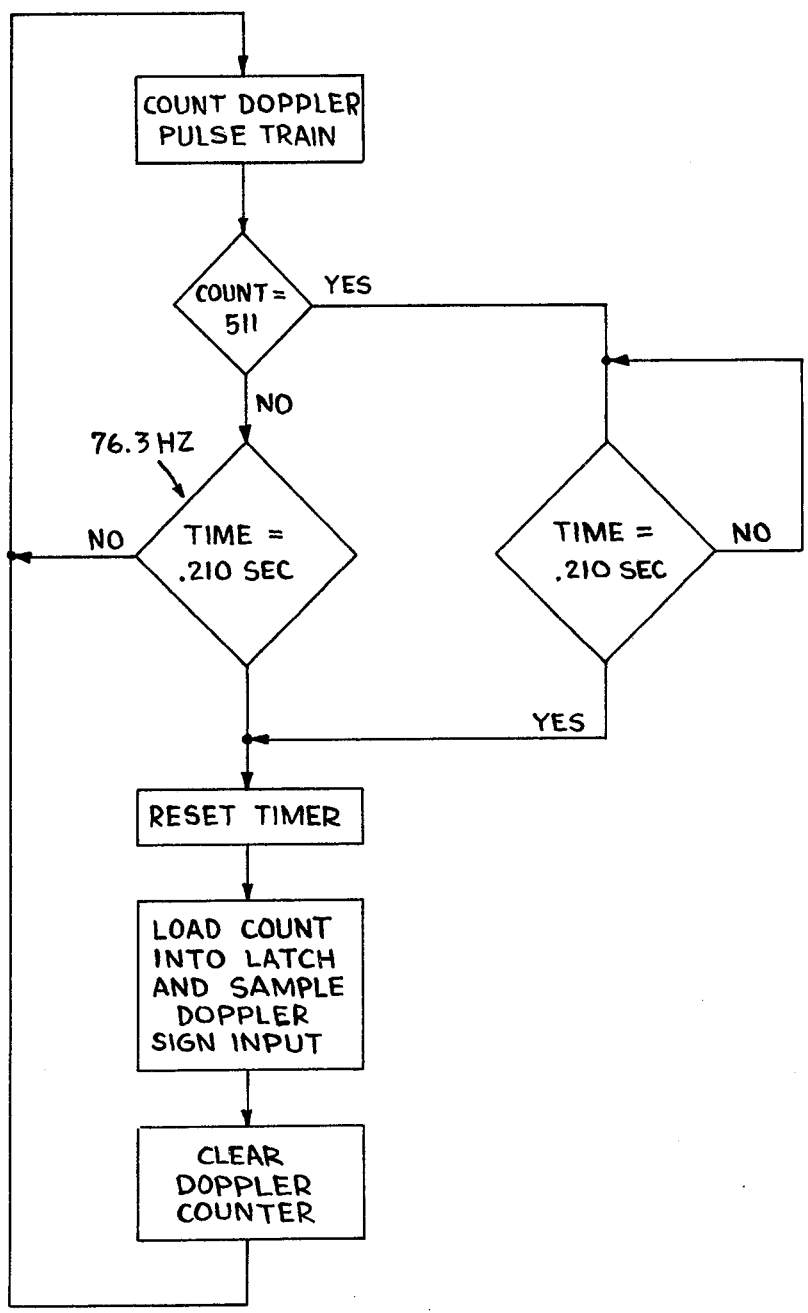
FIG. 11 shows the timing sequence for the counter in FIG. 10.

The velocity measurement control circuit includes a 4-bit binary up-counter that counts 76.3 HZ timing clock. Once every 16 counts (0.210 seconds), the line CO is pulsed high, which causes a 2 bit Johnson counter 46 to clear to 00 state. When CO goes low, the Johnson counter 46 counts the 625 KHC work clock until it reaches the 10 count at which it stops and waits for the next CO pulse. A Johnson counter counts as follows: 00; 01; 11; 10; 00. During the 00 state the output terminals of the counter are loaded into the D latches, the sign bit is sampled, and during 11, the velocity measurement counter is cleared to 0. At count 10, the 625 KHZ clock input terminals into the control timer is disabled. No action is taken during the 01 state. FIG. 11 illustrates the timing sequence. The teledyne Philbrick Module 47 calculates the horizontal speed from the X and Y velocity signals.

FIGS. 12,13,14 and 15 show the circuitry on the DOPXY and DOPZ boards for interfacing between the CONT boards and external equipment.

Figure 12:
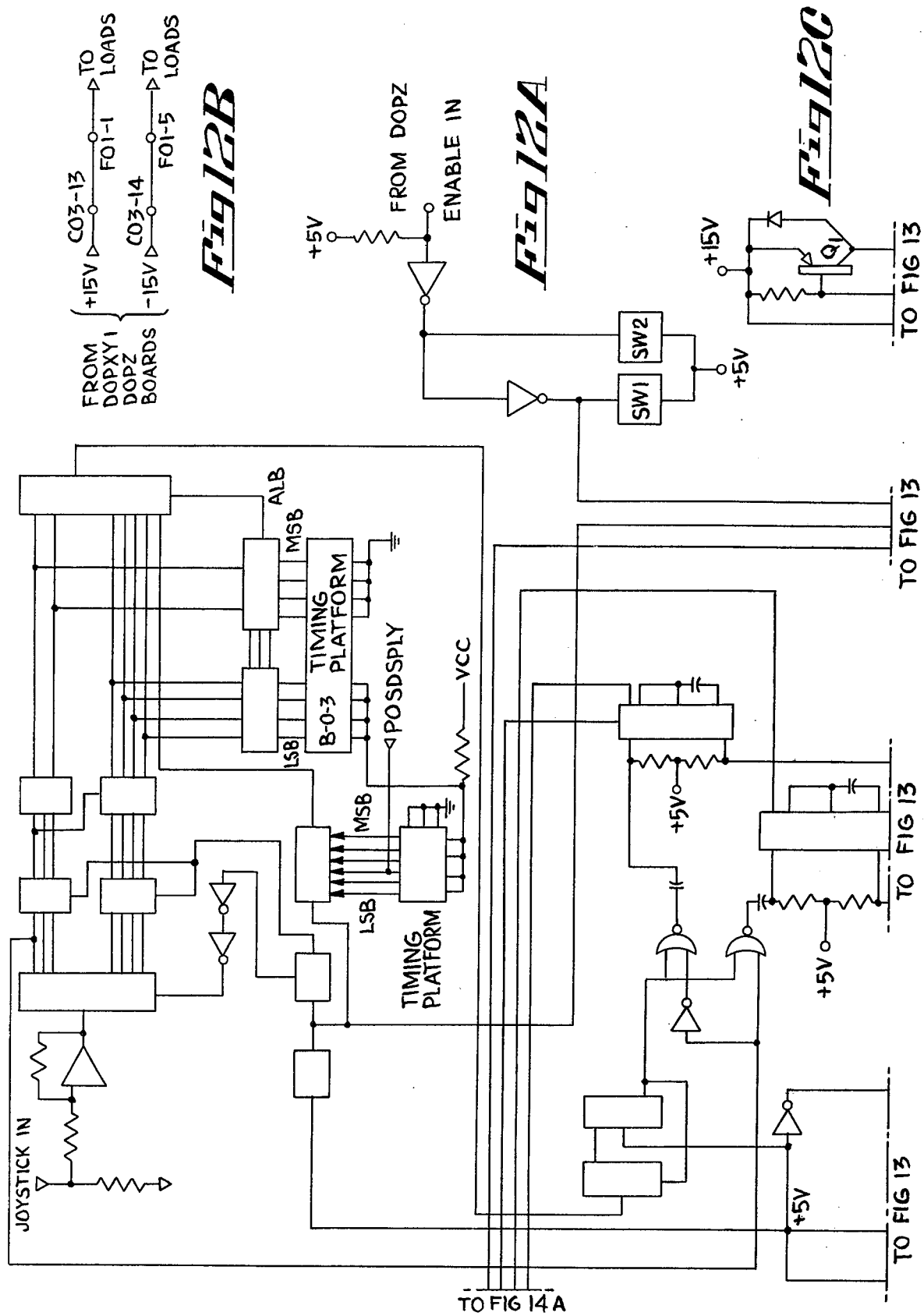
FIGS. 12A, 12B 12C, 13, 14A, 14B, and 15 are circuit diagrams for CONTX and CONTY according to the invention.
Figure 13:
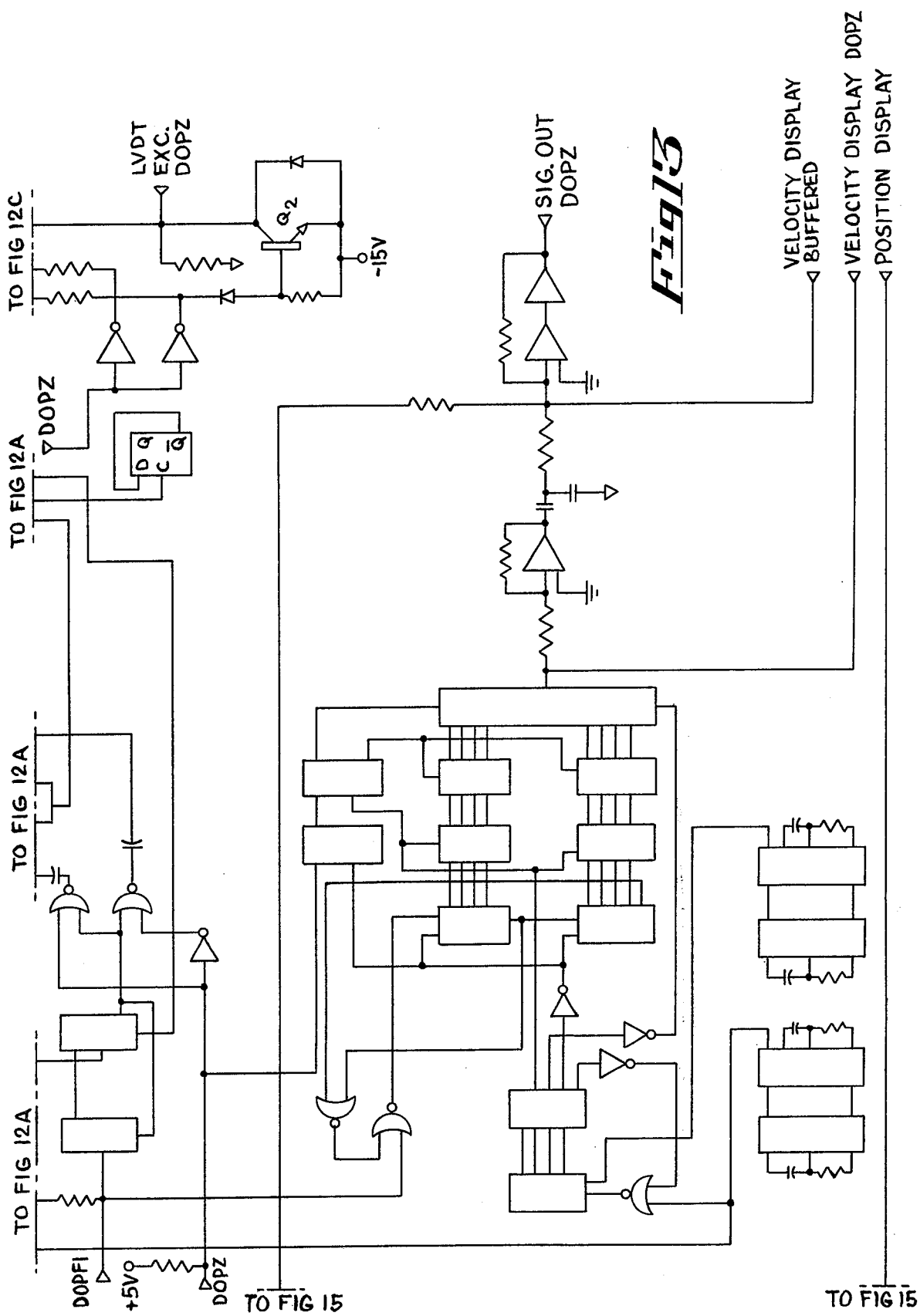
Figure 14:
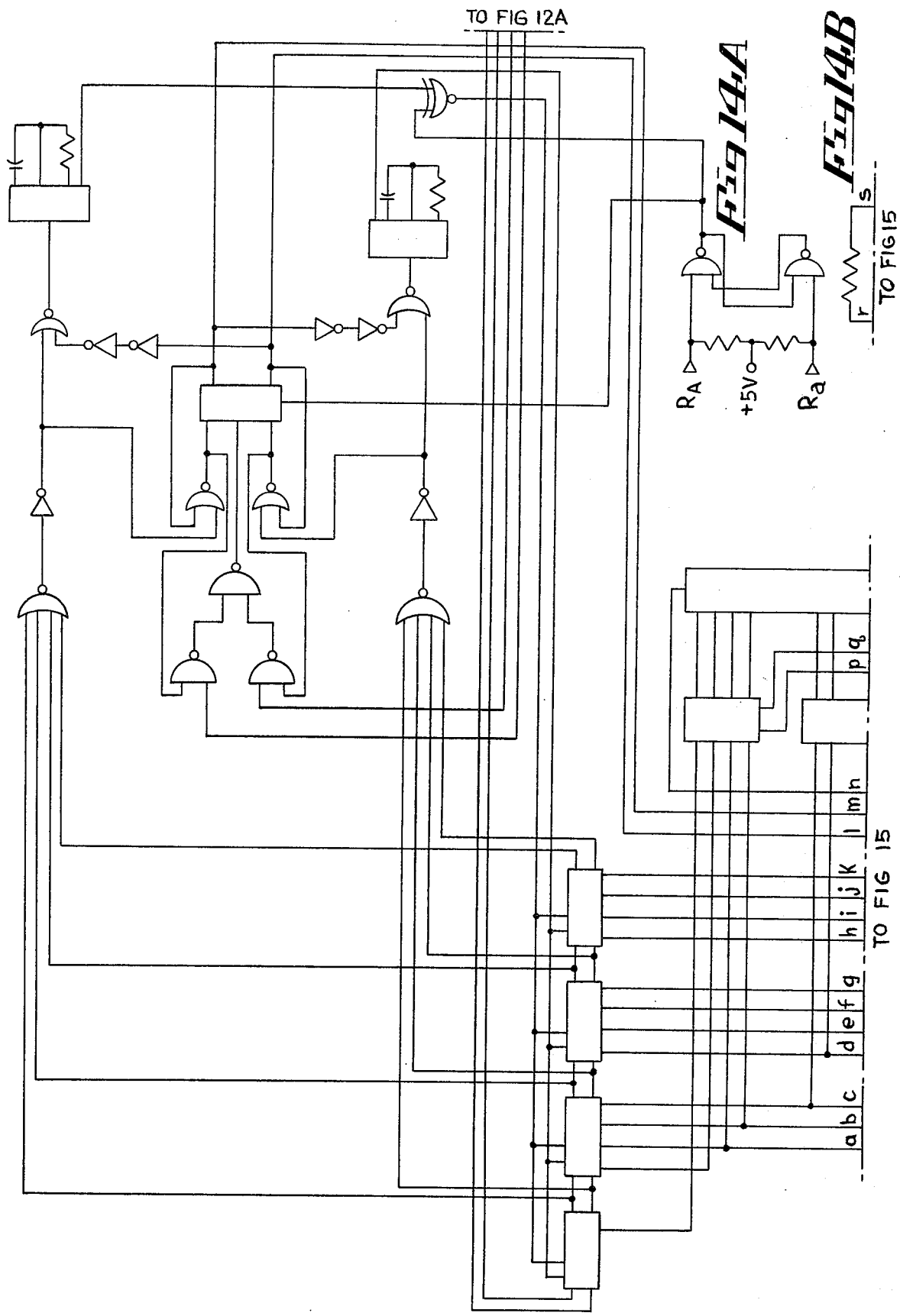
Figure 15:
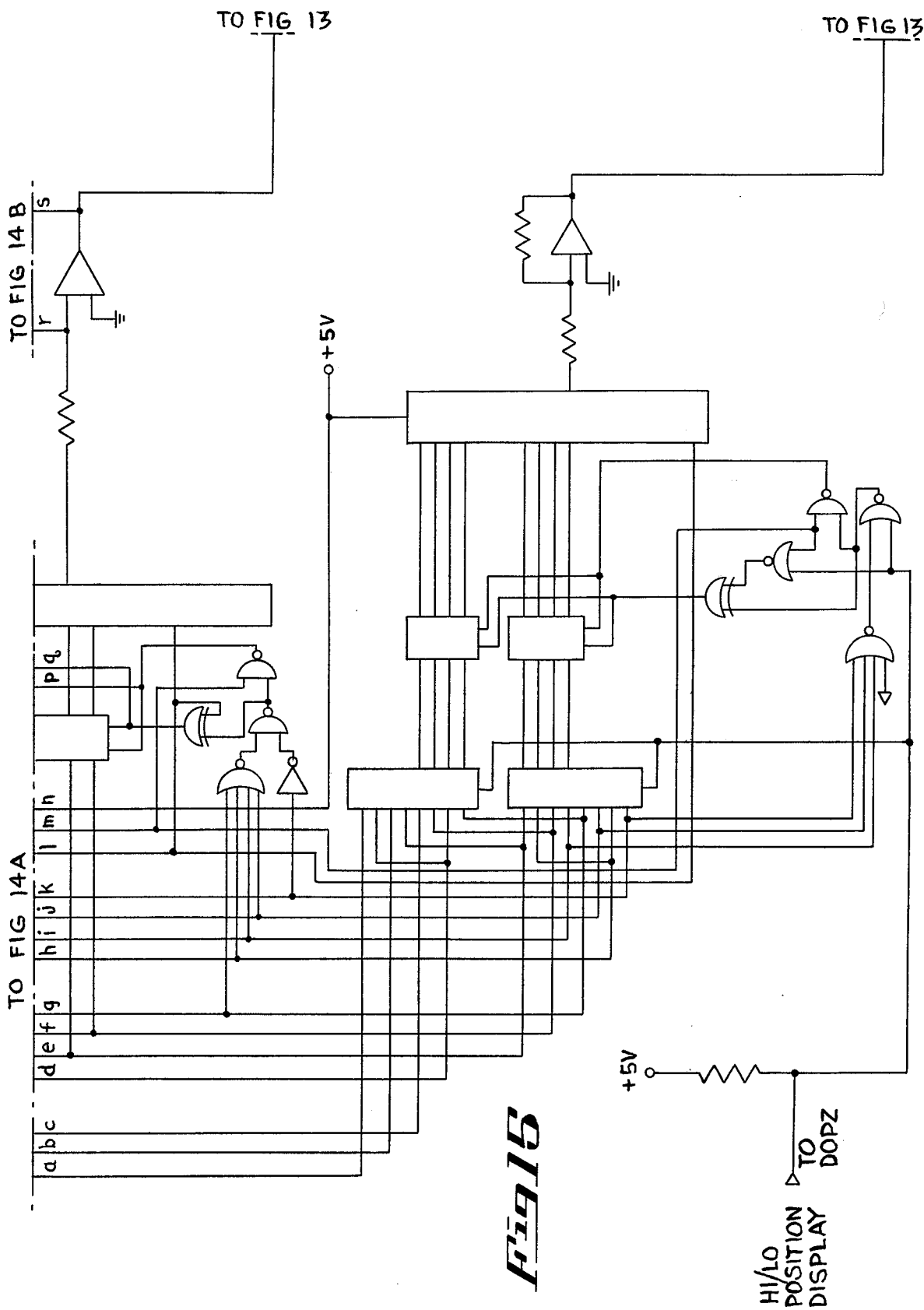
Figure 16:
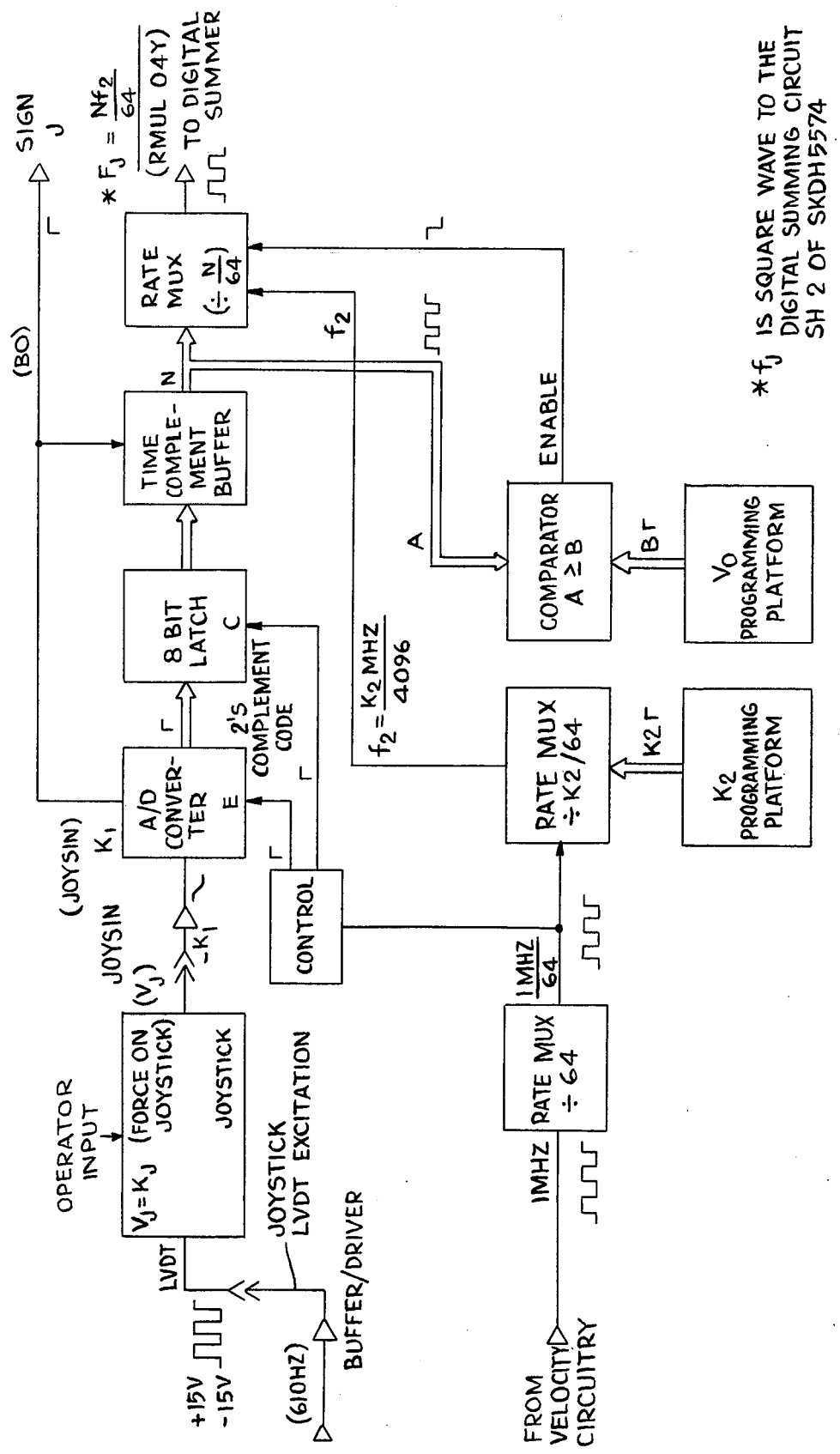
FIG. 16 is a block diagram of the input system to the JOYSTICK according to the invention.

FIGS. 12 and 13 show the JOYSTICK input circuitry. The 610 HZ reference clock from the DOPZ board is amplified from a 0 to 3 volt TTL level signal to a ± 15 volt peak-to-peak square wave signal for energizing the primary windings of the JOYSTICK LVDT's. There are two LVDT devices in the JOYSTICK, one for the X axis vector and one for the Y axis vector. The signals from the secondary windings are rectified and filtered to produce two + 3-volt DC signals: JOYSINX and JOYSINY. The magnitude from each of these signals is proportioned for the force applied to the JOYSTICK.

The JOYSINX and JOYSINY signals are received by the DOPZ board and distributed to the CONTX and CONTY boards. The JOY SIN signal is amplified by the (−K1) and converted to an 8 bit 2's compliment digital code. The A/D conversion circuit 3 samples the output of A1, converts and stores the seven most significant bits in an 8 bit D latch. The count lines are disabled and the preset and parallel output terminals are used to make each counter operate as a four-bit D latch.

In operation, when a conversion is completed, the digital code is stored in the latch, the converter is reset and enabled to start the next conversion with an operating frequency of approximately 6 KHZ. The output signals of the latch are buffered and inverted when a negative JOYSTICK sign is detected (CONTRO 5QA equals 1) to produce a 6-bit binary code without sign. This code is the programming constant N. It is also compared to a program constant $D_{DH}$. If it is less than or equal to this constant, the rate MUX is disabled and if it is greater than $D_{DH}$ the rate MUX produces a pulse train signal with a frequency $f_0$ equal to $f_2$ times N/64 where N is the 6 bit programming constant. The frequency $f_2$ is derived from a 1 MHZ work clock and is equal to $(K_2/4096) \times (1 \text{ MHZ})$. The rate MUX's at al-5 and Al-1 produce the $f_2$ clock signal from 1 MHZ. The constant $K_2$ is a 6-bit word (RM 01 − RM 032). RM 04 equals unity when the operator has selected the high range from the cursor meter display and zero at all other times. The other five bits are programmed at platform AO2. In summary, $$fo = \frac{1 \text{ MHZ } N K_2}{(64)^3} = 3.82 N K_2 \text{ HZ}$$

$$N = / - K_1 JOYSIN/ = K_1 JOYSIN$$

and $fo = 3.82 K_1 K_2 JOYSIN \text{ HZ}.$

This is only true when N is greater than $V_{TH}$. For values less than $V_{TH} f_0$ equals zero. Then, $V_{TH}$ can be considered a dead band around zero to prevent error pulses on the $f_0$ line from being generated by console vibrations or offset voltages on the JOYSIN line.

Figure 17:
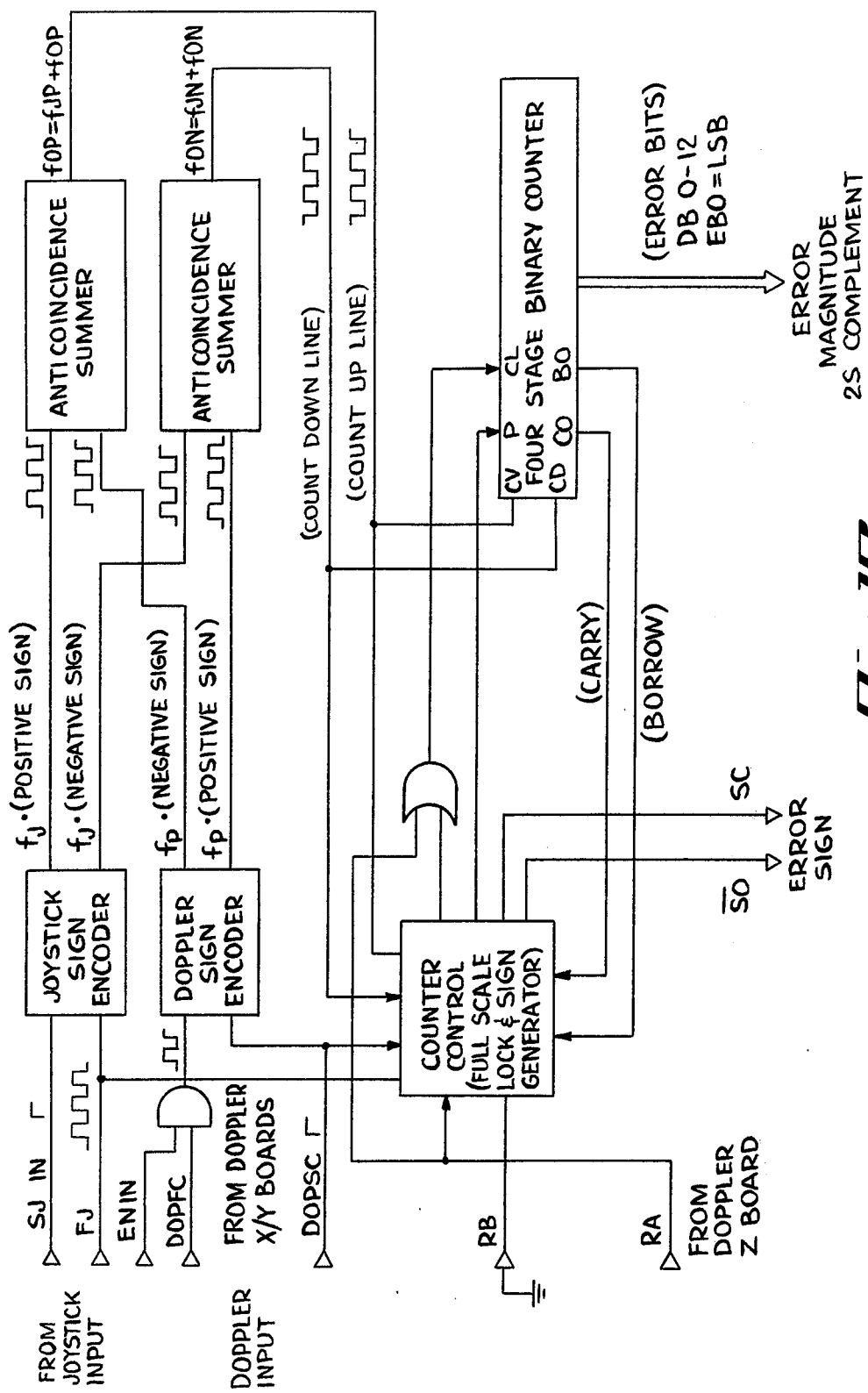
FIG. 17 is a block diagram of the digital summing circuit coupled to the system in FIG. 16 according to the invention.

The digital summing circuitry is shown in FIG. 17. The $f_0$ pulse train signal in sign from the JOYSTICK input circuitry and the DOPXC pulse train signal DOPSC sign from the Doppler system are combined to produce the digital offset (error) word. The DOPXC signal normally includes the Doppler velocity pulse train signal. If S1 on the DOPZ board is on test, the 610-HZ reference clock signal is connected to this line. Similarly, the DOPSC signal carries the status of the sign switch in the test mode and the Doppler velocity sign when in the Doppler mode. When the sign is positive, DOPSC equals zero. The DOPSC signal is disabled whenever the BNIM signal is low. Both the DOPSC and $f_0$ are processed through sign encoders which gate the input pulse train signal onto positive and negative lines according to the status of the sign information. The positive line of the JOYSTICK encoder and the negative line of Doppler encoder are capacitively coupled to the count up 1-shot at E-1-5 which produces a pulse signal whenever either of the input lines are pulsed. A delay circuit in the sign encoder circuitry in the form of 2D latches prevents two pulses from being generated simultaneously. The output frequency of the count up (CU) 1-shot equals $f_J$ POSITIVE plus $f_D$ NEGATIVE where $f_J$ POSITIVE is equal to the JOYSTICK input signal frequency when the sign is positive and equal to zero when the sign is negative and $f_D$ NEGATIVE is equal to the Doppler frequency when the Doppler sign is negative and equal to zero when the sign is positive. Similarly, the negative line of the JOYSTICK encoder and the positive line of the Doppler are capacitively coupled into the count 1-shot to produce the count down (CD) pulse train signal.

The CU and CD pulse train signals close a 16-bit binary counter to count up when the CU is pulsed and to count down when the CD line is pulsed. The 13-bit output word from these counters represents the lower 13-bits of the 14-bit error (offset) word in the 2's complement coding. The MSB of this word (sign bit) is generated by the counter control circuitry. A JK flip-flop at location F-1-2 stores the sign status of the error word and is controlled by the carry out and borrow out lines from the counter section. Whenever the sign is positive, and all four counting stages generate a borrow out indicating that the counters are rolling over (counting down) from all 0's to all 1's, the flip-flop is toggled and the line becomes an 1 indicating a negative sign. The counter then changes froma 0 to −1 in 2's complement format. Likewise, when a carry out is generated and the sign is negative, the signal will change to a 0. The counters have changed from all 1's (−1 in 2's complement) to all 0's (+ 0 in 2's complement). When the sign is positive and the four counters generate a carry out indicating that they are all counting up from all 1's to all 0's (a positive $2^{16} - 1$ to 0), the controller 43 prevents counting by presetting the counters to all 1's. When the sign is negative and a borrow is generated, the counter is counting down from all 0's to all 1's (from a $-2^{16}$ to 0), the count is prevented by generating a clear pulse. The controller stores the proper sign information along with locking the counter at plus or minus full scale to prevent the overflow condition.

The foregoing operation is summarized by Table 1.

Table 1

|  | SIGN | CARRY OUT | BORROW OUT |
|---|---|---|---|
| (JK01Q=0) | + | Prevent counting presetting to 1's | Change sign to − and allow counting |
| (JK01Q=1) | − | Change sign to + and allow counting | Prevent counting by clearing to 0's |

Each Doppler pulse is equivalent to approximately 5.6mft at a nominal Doppler interface of 300 HZ/Knot so that the LSB is equal to 5.6mft. The counter is capable of representing any number from +5.6 $(2^{16} − 1) \times 10^{-3} = 366.9$ to −5.6 $(2^{16}) \times 10^{-3} = −367$ft. This error word is routed to the position display in control route position circuitry.

Figure 18:
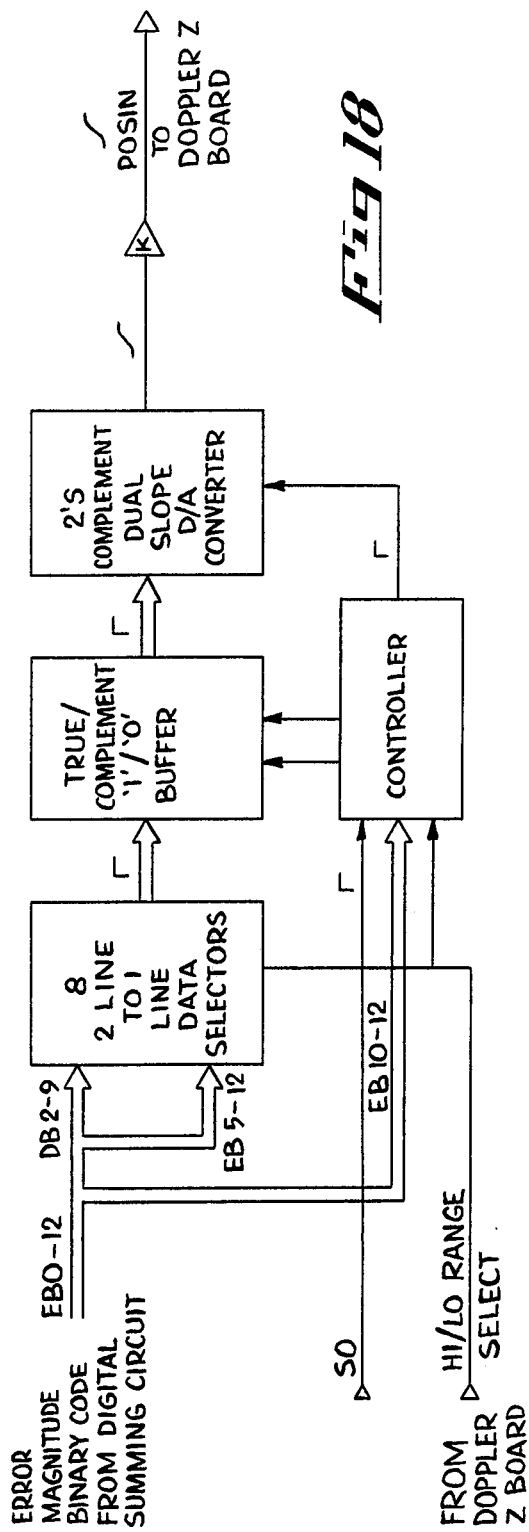
FIG. 18 is a block diagram of the position display system according to the invention.

The position display circuitry is shown in FIG. 18. Depending upon the selection of a HIGH/LOW range, the position display circuitry uses either the most significant 8-bits of the error word (high range) or the middle 8-bits (low range) to control an 8-bit D/A convertor. The 8-bit, 2-line to 1-line data selector gates the proper 8-bit word into the buffer and is controlled directly by the HI/LO range select switch. The HI/LO line is a 1 for the high range and in this range the true-complement −1−0 buffer operates in the true state (the output signal equals the input signal). In the low range, the output signal equals 1 regardless of the input signal whenever one of the three MS bits equals 1 and the sign is positive and the output equals 0 whenever any of the MS bits equal 0 and the sign is negative. These correspond to ± full scale states in low range. For example, it would be incorrect to consider +1100000000 as 00000000 simply because the 2MS bits were not used. Instead, a 11111111 code should be used to control the D/A convertor whenever any of the higher bits are not used and a positive sign exists. As the most significant 8 bits are used in the high range, this problem does exist in that mode.

The 9-bit D/A converts the 9-bit 2's complement word into a + 10 volt analog signal that is amplified by −K for control of the cursor dot and cursor meter interface circuitry on the DOPZ board. The constant K can be adjusted using the potentiometer at D-2-1. A + 10 volts corresponds to −200 ft on the high range and −25ft on the low range. A −10 volt level represents a +200ft on the high range and +25ft on the low range.

The controller circuit on the block diagram includes five gates that create the proper code bits for controlling the programmable buffer from the error sign, 3MS error bits, and the HI/LO lines.

Figure 19:
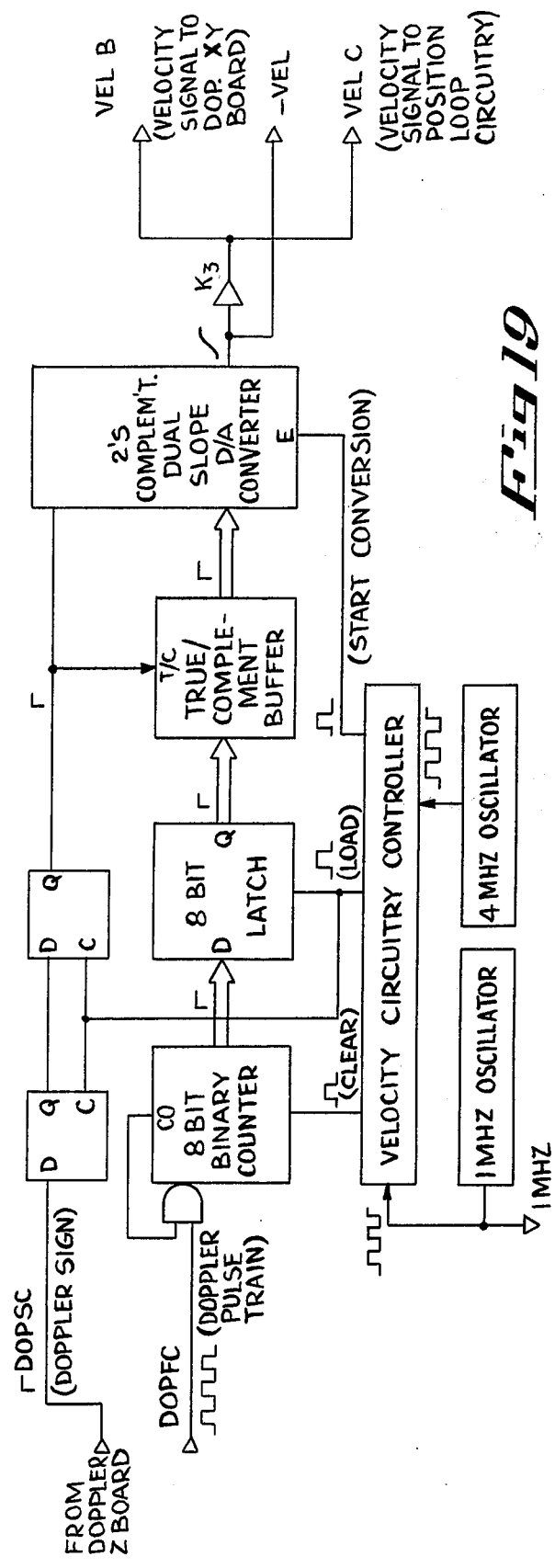
FIG. 19 is a block diagram of the velocity logic control system according to the invention.

The position loop circuitry is shown in FIG. 21. The circuit includes a D/A convertor section and an analog summing junction that produces an analog control signal which is the subsea thruster control command. The 8 LS bits of the error word are processed through a programmable buffer identical to that used in the position display circuitry. The output terminals of the buffer are forced to all 1's whenever any of the five most significant bits are 1's and the sign is positive and to all 0's when all the five most significant bits are 0 and the sign is negative. These correspond to the + and − full scale status. The 8 bits from the buffer along with the sign bit make up the 9-bit word to the D/A convertor that produces ± 10 volt analog position signal that is somewhat the velocity signal to produce the control signal. The control signal modulates a driver amplifier that transmits the signal to a subsea thruster control circuit. The velocity circuitry is shown in FIG. 19. The operation of the circuitry is similar to the vertical velocity circuitry. The D/A convertor provides a bipolar analog signal that can vary between ± 10 volts. The 9-bit digital input signal is in 2's complement code. The MSB is the sign bit and is equal to the DOPSC sign delay by conversions cycles. The D latches perform this delay function. In operation, two 4-bit counters count the pulse train signal on the DOPXC line for a period of 0.250 seconds at which time the 8-bit output work of the counter is stored in and 8-bit latch (two parallel in/parallel out, up counters with count disable), and the DOPSC line is sampled and stored. The counters are then clear and start counting for the next cycle. The primary output signals of the latches are inverted by the programmable buffer whenever the stored sign bit equals D, negative sign, to produce the 2's complement code. The controller circuitry uses two clock generators, as 1 MHZ work clock signal, also distributed to other circuitry and a 4-HZ timing clock signal for creating the sample periods. Both clock signals are generated by using two 1-shots with positive effect. The control includes a vinary up counter and a 4-line to 10-line decoder. The counter is cleared and enabled the beginning of the timing period. It counts the 1-MHZ work clock signal until the count is 6 at which time the count line is disabled. The 1-count clocks the DOPXC counter information into the storage latch, the 3-count loads the information into the D/A convertor and the 5-count begins counting the DOPSC line for the 250-MS. FIG. 21 illustrates this control action.

The + 10 volt analog velocity output signal is amplified by −$K_3$ and is distributed to the control signal summing junction and to the DOPZ board where it is used by the vector adding circuitry for calculating horizontal speed.

We wish it to be understood that we do not desire to be limited to the exact detail of instructions shown and described, for obvious modifications will occur to a person skilled in the art.

Having thus described the invention, what we claim as new and desire to be secured by Letters Patent, is as follows:

We claim:
1. A position control system, for use in positioning relative to a subsea well a subsea vehicle or re-entry tool having thrusters, comprising, in combination:
   a Doppler sonar system connected to said vehicle and operable for generating a Doppler pulse train signal having a pulse rate substantially proportional to the Doppler frequency produced by a change in the spatial position of said vehicle along a predetermined linear coordinate, whereby the occurrence of each pulse signal in said Doppler pulse train signal corresponds substantially to a predetermined linear distance;
   velocity measurement means connected to said Doppler pulse train signal and operable for converting it into an equivalent velocity amplitude;
   a pulse generator operable for producing a predetermined number of pulse signals equivalent to a certain linear distance along said coordinate;
   up/down counter means operable for counting up from one input signal and down from another input signal;
   connection means operable for connecting said up/down counter means to said Doppler pulse train signal and said pulse generator for opposite counting therein;

drive means connected to said up/down counter means and operable for supplying the count therein as an error signal for controlling one of said thrusters; and coupling means operable to couple said drive means to said one thruster.

2. The system as claimed in claim 1, wherein said velocity measurement means comprises a first counter operable for counting and storing a plurality of pulse signals, a second counter operable for receiving and storing a pulse signal count from said first counter and transferring means operable for transferring the pulse signal count in said first counter to said second counter.

3. The system as claimed in claim 2, wherein said velocity measurement means further comprises a timing generator means operable for producing pulse signals at a predetermined rate and coupling means operable for connecting said timing means to said first counter in response to an energizing signal.

4. The system as claimed in claim 1, further comprising an anti-coincidence means between said up/down counter means and the signals connected thereto and operable for controlling two pulse signal trains to prevent said up/down counter means from receiving two pulses simultaneously.

5. The system as claimed in claim 1, further comprising;

a second Doppler sonar system connected to said vehicle and operable for generating a second Doppler pulse train signal having a pulse rate substantially proportional to the Doppler frequency produced by a change in the spatial position of said vehicle along a second predetermined linear coordinate, whereby the occurrence of each pulse signal in said second Doppler pulse train signal corresponds substantially to a predetermined linear distance;

a second velocity measurement means connected to said second Doppler sonar system and operable for converting it into a second equivalent velocity amplitude; a second pulse generator operable for producing a predetermined number of pulse signals equivalent to a second certain distance along said second coordinant;

second up/down counter means operable for counting up from one input signal and down from another input signal;

second connection means operable for connecting said second up/down counter means to said second Doppler pulse train signal and said second pulse generator for opposite counting therein;

second drive means connected to said second up/down counter and operable for supplying the count therein as an error signal for controlling another one of said thrusters; and coupling means operable to couple both of said drive means to respective thrusters.

* * * * *